(12) United States Patent
Maldonado Arjona et al.

(10) Patent No.: US 11,811,513 B2
(45) Date of Patent: *Nov. 7, 2023

(54) METHODS AND SYSTEMS FOR MANAGING MULTIPLE CONTENT DELIVERY NETWORKS

(71) Applicant: Capital One Services, LLC, McLean, VA (US)

(72) Inventors: Jose Maldonado Arjona, McLean, VA (US); Amelia Neil, McLean, VA (US); Sean Finney, McLean, VA (US); Timothy Shull, McLean, VA (US); Ahmed Mustafa, McLean, VA (US); Nithya Lakshminarayanan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,458

(22) Filed: Dec. 30, 2022

(65) Prior Publication Data
US 2023/0138229 A1 May 4, 2023

Related U.S. Application Data

(63) Continuation of application No. 17/491,158, filed on Sep. 30, 2021, now Pat. No. 11,558,314, which is a continuation of application No. 17/112,364, filed on Dec. 4, 2020, now Pat. No. 11,184,294.

(51) Int. Cl.
| | |
|---|---|
| *H04L 67/1097* | (2022.01) |
| *H04L 47/70* | (2022.01) |
| *G06F 9/54* | (2006.01) |
| *H04L 69/329* | (2022.01) |
| *G06F 3/0482* | (2013.01) |

(52) U.S. Cl.
CPC .......... *H04L 47/82* (2013.01); *G06F 9/547* (2013.01); *H04L 67/1097* (2013.01); *H04L 69/329* (2013.01); *G06F 3/0482* (2013.01)

(58) Field of Classification Search
CPC ...... H04L 47/82; G06F 9/457; H04L 67/1097; H04L 69/329; G06F 3/0482
USPC ............................. 709/220, 224, 226, 228
See application file for complete search history.

(56) References Cited

U.S. PATENT DOCUMENTS

| | | | | |
|---|---|---|---|---|
| 9,167,050 | B2* | 10/2015 | Durazzo et al. | H04L 63/20 |
| 11,184,294 | B1* | 11/2021 | Maldonado Arjona et al. | |
| | | | | G06F 9/44505 |
| 2014/0053280 | A1* | 2/2014 | Durazzo et al. | H04L 63/10 |
| | | | | 726/28 |
| 2015/0324568 | A1* | 11/2015 | Publicover et al. | G06V 40/19 |
| | | | | 726/19 |

(Continued)

FOREIGN PATENT DOCUMENTS

| | | | | |
|---|---|---|---|---|
| CA | 2907272 | A1* | 9/2014 | .......... G06F 1/1626 |
| CN | 112039840 | A * | 12/2020 | .......... H04L 63/1416 |

*Primary Examiner* — Khanh Q Dinh
(74) *Attorney, Agent, or Firm* — Perkins Coie LLP

(57) ABSTRACT

Methods and systems are for a content delivery management platform that organizes and monitors content delivery networks by the applications, features, or functions that they serve. The content delivery management platform is agnostic to the content delivery network. To provide this functionality, the content delivery management platform uses an abstraction layer to interface between the content delivery networks and the needs of the content provider (e.g., the owner of the content delivery management platform) as it serves users (e.g., provides the applications, features, or functions).

20 Claims, 6 Drawing Sheets

(56) References Cited

U.S. PATENT DOCUMENTS

| | | | |
|---|---|---|---|
| 2016/0149769 A1* | 5/2016 | Joshi et al. | H04M 15/8016 |
| | | | 715/739 |
| 2016/0191600 A1* | 6/2016 | Scharber et al. | H04L 67/02 |
| | | | 709/223 |
| 2020/0169478 A1* | 5/2020 | Joshi et al. | G06Q 50/10 |
| 2021/0151056 A1* | 5/2021 | Trim et al. | G10L 13/027 |

* cited by examiner

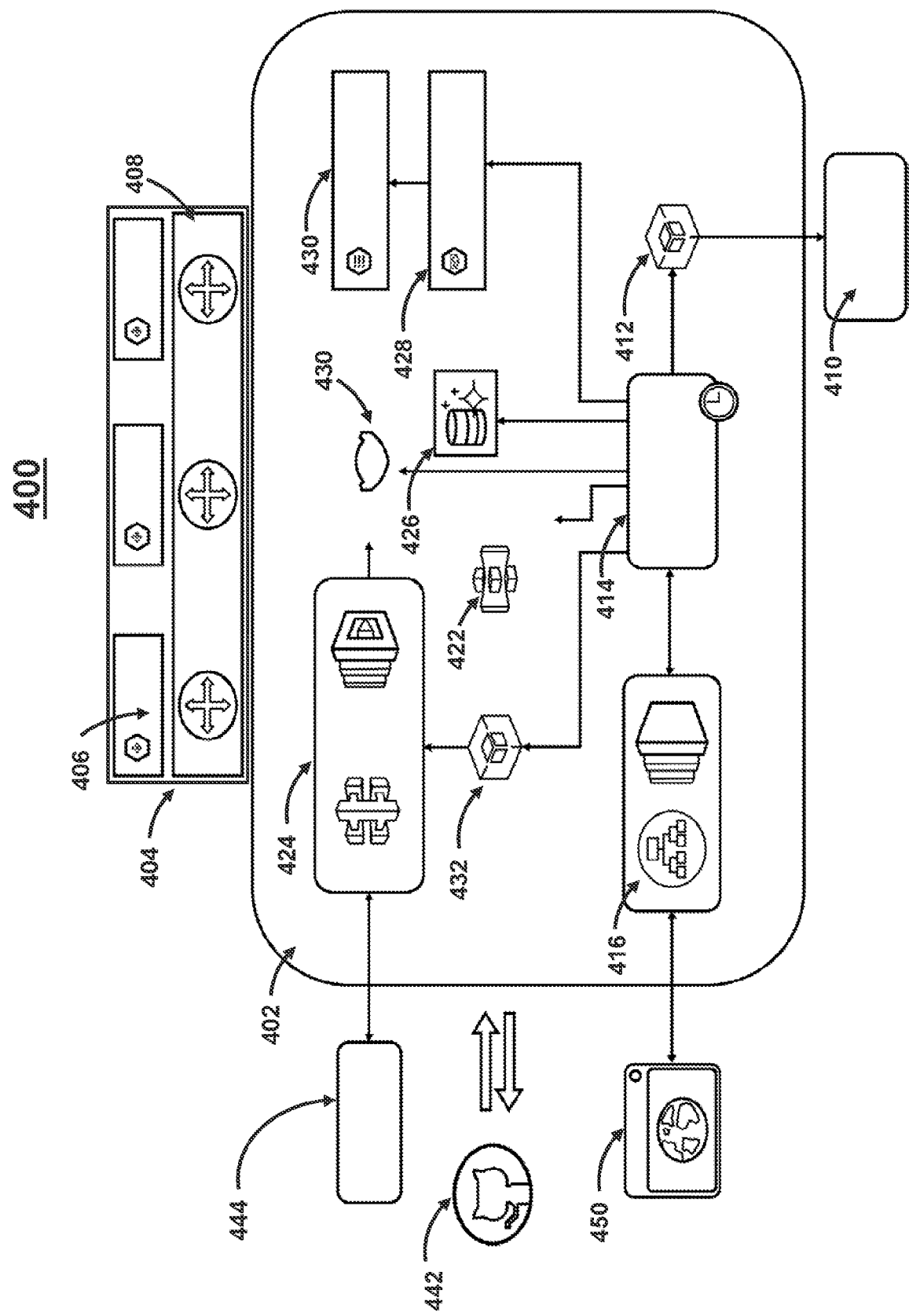

500

502 → cdn-mgr-config/
　　　　config.json
504 → /context1
　　　　　custom.json
　　　　　main.json
506 → /context2
　　　　　custom.json
　　　　　main.json

550

```
552 → {
         "provider" : ["akamai", "fastly", "aws"],
554 →    "credentials" : "cos.pullCredentials()",
         "<RESOURCE_NAME>" : {
           "domains" : {
             "www.capitalone.com" : "<EDGE_HOSTNAME>",
             "www-qa.capitalone.com" : "<EDGE_HOSTNAME>",
             "www-dev.capitalone.com" : "<EDGE_HOSTNAMES>"
           },
556 →      "metadata" : "<IDENTIFYING INFO>",
           "variables" : {
             "origins" :["ORIGIN1", "ORIGIN2"]
558 →      },
           "rules" : {
             "default_cache_behavior" : {
               "match": {"path" : "/"},
               "allowed_methods" : ["DELETE", "GET", "HEAD",
         "OPTIONS", "PATCH", "POST", "PUT"],
               "origin" : "variables.origins[0]"
             },
             "ordered_cache_behavior" : {}
           },
           "tags" : [],
           "certificates" : []
         }
```

FIG. 5

METHODS AND SYSTEMS FOR MANAGING MULTIPLE CONTENT DELIVERY NETWORKS

CROSS REFERENCE TO RELATED APPLICATIONS

This application is a continuation of U.S. Pat. Application No. 17/491,158, filed on Sep. 30, 2021, which is a continuation of U.S. Pat. Application No. 17/112,364, filed Dec. 4, 2020, now U.S. Pat. No. 11,184,294, issued on Nov. 23, 2021. The contents of the foregoing applications are incorporated herein in their entirety by reference.

FIELD OF THE INVENTION

The invention relates to managing multiple content delivery networks using a content delivery management platform.

BACKGROUND

A content delivery network is a geographically distributed network of proxy servers and their data centers, the goal of which is to provide high availability and performance by distributing the service spatially relative to end users. Some commercial content delivery networks serve content providers by allowing content providers to use their resources for content delivery.

SUMMARY

Methods and systems are described herein for improved management of multiple content delivery networks. For example, in order to maintain performance and ensure reliability, a content provider may use multiple content delivery networks. Furthermore, some content delivery networks may specialize in particular resource types. Accordingly, a content provider may engage multiple content delivery networks at one time. However, after engaging a content delivery network, switching between content delivery networks becomes difficult. First, in conventional systems, content delivery networks may be organized by a domain or file. As such, applications, features, or functions provided by a given content delivery network may be coded and configured specifically for that content delivery network. Second, switching from one content delivery network to another would necessarily cause the applications, features, or functions provided by that content delivery network to be at least temporarily inaccessible. Finally, even if a content provider wished to assess switching content delivery networks, it is often difficult to determine what applications, features, or functions are supported by the resources of a given content delivery network.

To overcome these problems, the methods and systems herein describe a content delivery management platform that organizes and monitors content delivery networks by the applications, features, or functions that they serve. That is, the content delivery management platform does not designate specific domains and/or files reserved for a given content delivery network. Instead, the content delivery management platform is agnostic to the content delivery network. To provide this functionality, the content delivery management platform uses an abstraction layer to interface between the content delivery networks and the needs of the content provider (e.g., the owner of the content delivery management platform) as it serves users (e.g., provides the applications, features, or functions).

The abstraction layer maps a portion of the plurality of applications (e.g., one or more applications and/or parts of an application) to one or more content delivery network. The abstraction layer performs this mapping based on a schema that includes respective system contexts for each application of the plurality of applications. The system contexts allow governance and/or rules to be set for each application. The content delivery network therefore must conform to these rules. The abstraction layer also provides a user interface featuring data analytics and graphical representations for managing the content delivery networks. Through this user interface, a content delivery management platform allows the management, selecting, and/or migration of content delivery networks as well as provides recommendations for these actions.

Additionally, the abstraction layer provides an interface for receiving and implementing source code updates to the content delivery management platform. For example, the abstraction layer provides an environment in which changes and/or updates to the content delivery management platform or applications thereof may be received, tested/validated, and/or implemented, thus ensuring that the content delivery management platform maintains a continuous integration, continuous delivery, and/or continuous deployment environment.

In some aspects, methods and systems are described for managing multiple content delivery networks using a content delivery management platform. For example, the system may receive, at an abstraction layer of the content delivery management platform, a first interface for a first content delivery network and a second interface for a second content delivery network, wherein the first content delivery network comprises a first network of data processing resources, and wherein the second content delivery network comprises a second network of data processing resources. The system may retrieve, at the abstraction layer, a plurality of applications supported by the content delivery management platform. The system may map, at the abstraction layer, a first portion of the plurality of applications to the first content delivery network, wherein mapping the first portion of the plurality of applications comprises utilizing the first network of data processing resources to provide the first portion of the plurality of applications. The system may map, at the abstraction layer, a second portion of the plurality of applications to the second content delivery network, wherein mapping the second portion of the plurality of applications comprises utilizing the second network of data processing resources to provide the second portion of the plurality of applications. The system may then generate for display, on a user interface, a first graphical representation identifying applications in the first portion of the plurality of applications and applications in the second portion of the plurality of applications.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 4 shows an architectural diagram of a content delivery management platform for managing multiple content delivery networks, in accordance with one or more embodiments.

FIG. 5 shows illustrative pseudocode for a content delivery management platform, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications, features, and functions (collectively referred to herein as "applications") provided by a content delivery management platform, or owner thereof.

Figure 1:
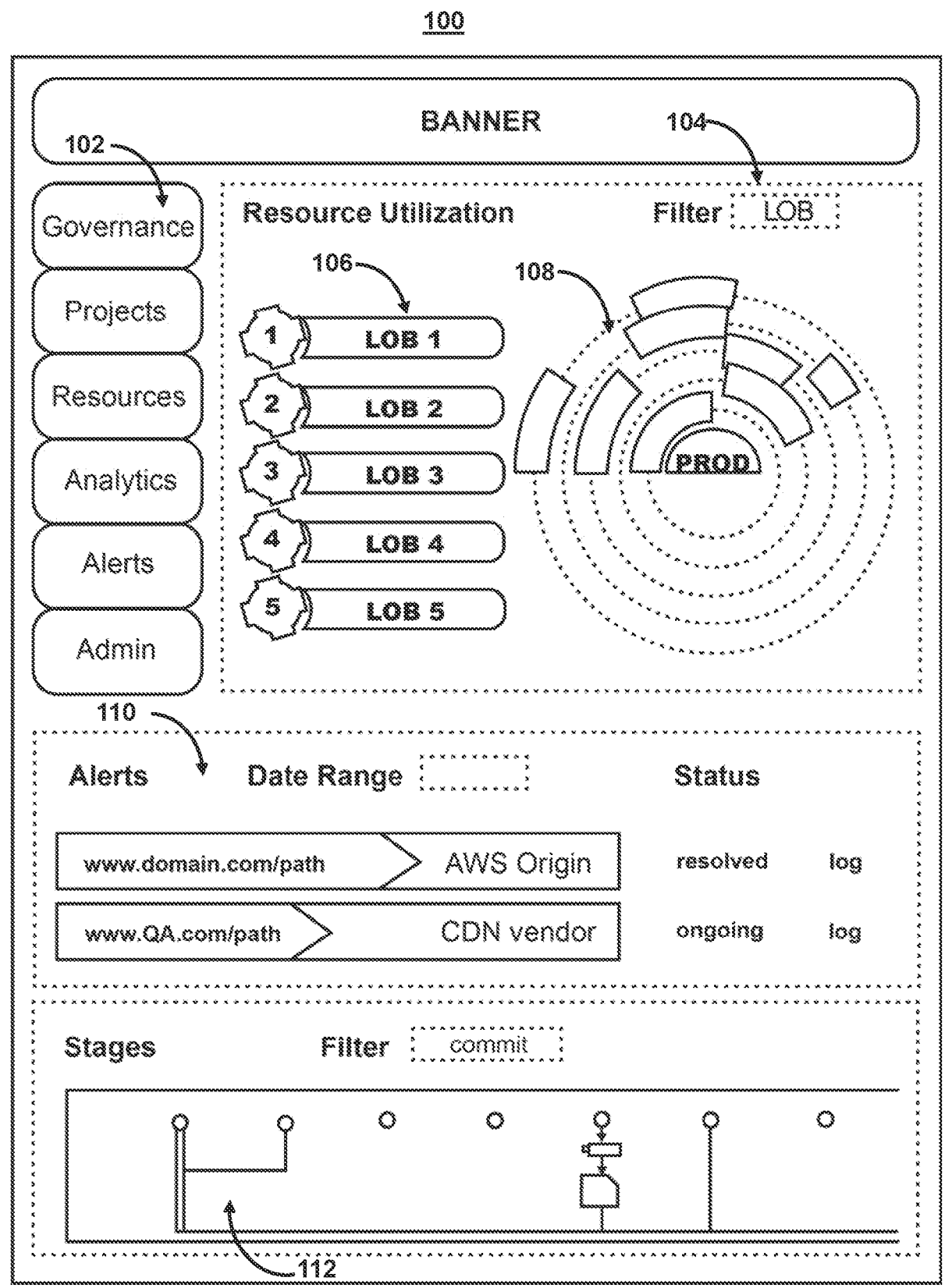
FIG. 1 shows an illustrative user interface for a content delivery management platform for managing multiple content delivery networks, in accordance with one or more embodiments.

FIG. 1 shows an illustrative user interface for a content delivery management platform for managing multiple content delivery networks, in accordance with one or more embodiments. For example, FIG. 1 shows user interface 100. User interface 100 may be used by a user of a content delivery management platform to manage content delivery networks by reviewing how different applications, features and lines of business ("LOBs") are serviced and/or integrated with different content delivery networks.

For example, using icons 102, a user may select and/or review governance and/or governance protocols used by the content delivery management platform. The user interface may provide options to review and/or update governance for all content delivery networks, particular applications, and/or content delivery networks that service a particular application. Through user interface 100, the system may allow governance to be declared once through a single authority as opposed to manual updates in individual applications through the source code of the individual applications. For example, user interface 100 allows a user to review resource (e.g., content delivery networks) and project development through graphical representation 106 and graphical representation 108. By organizing the resources, users of the system may better identify issues related to the multiple content delivery networks (e.g., costs, usage, security risks, etc.). For example, using icon 104, a user may filter applications. User interface 100 may also provide alerts as well as progress updates on integration of one or more content delivery networks with on-going applications as shown in alert section 110 and integration progress section 112. Alert section 110 may also include mapping recommendations.

As described herein, a mapping and/or integration recommendation may include any quantitative or qualitative recommendation for the mapping of one or more content delivery networks to a given application. It should be noted that as described herein an application may include applications, features and/or LOBs. The mapping recommendation may include one or more types of information. For example, the mapping recommendation may compare an individual content delivery network to itself (e.g., compare the content delivery network's current mapping/integration to a historical mapping/integration for the content delivery network) or a comparative analysis (e.g., compare the content delivery network to other content delivery networks) of the content delivery networks. The mapping/integration recommendation may be based on a utilization level of the content delivery network (e.g., either historic or current) and/or the utilization level of other content delivery networks (e.g., either historic or current). The mapping/integration level may include any quantitative or qualitative description of the content delivery network's mapping/integration and/or utilization.

The mapping/integration level may itself be based on one or more metrics. The metrics may reference to technical metrics (e.g., data processing loads, bandwidth, etc.) and/or may include any quantitative or qualitative description of a given content delivery network's mapping/integration with regards to a specific application. In some embodiments, the system may determine metrics based on specific data that is generated in addition to a content delivery network's normal utilization. This data may represent a quantitative assessment of the mapping/integration of the content delivery network. Furthermore, to limit bias and subjective input, the data may be normalized not to a specific application (e.g., how other content delivery networks performed on the specific application). Integration progress section 112 may show a log of progress, and/or key project markers, in the integration of a content delivery network into an application.

As described herein, the content delivery management platform may use CI/CD or CICD for software development. CI/CD refers to the combined practices of continuous integration and either continuous delivery or continuous deployment. CI/CD bridges the gaps between development and operation activities and teams by enforcing automation in building, testing and deployment of applications. The content delivery management platform may use the abstraction layer to institute the CI/CD environment. For example, computer programming is typically a team-based activity, in which the responsibilities for the features and source code necessary to produce a given project (e.g., a software application) are shared among team members. To facilitate this team activity, team members may submit contributions to the project to a distributed version control system. This system may include a codebase that features a full history of the project that is mirrored on every contributor's computer. The system may enable automatic management of different branches of the project as well as the merging of different contributions.

The content delivery management platform may implement the CI/CD environment by allowing the integration of new source code contributions to be submitted to a master branch, from a development branch, of the content delivery management platform. During submission, the system may perform verification checks, validation checks, etc. After verification, the system may commit the contribution to a release branch. By doing so, the content delivery management platform may provide enhanced velocity and safety through a pipeline for moving changes to production and reducing the number of detected issues. Furthermore, this migration prevents content delivery networks from being locked into a given application by the content delivery management platform. For example, the system may receive contributions to a content delivery network of changes from a software development event manager. The changes may then be tested in a queue (e.g., as shown in integration progress section 112).

Figure 2:
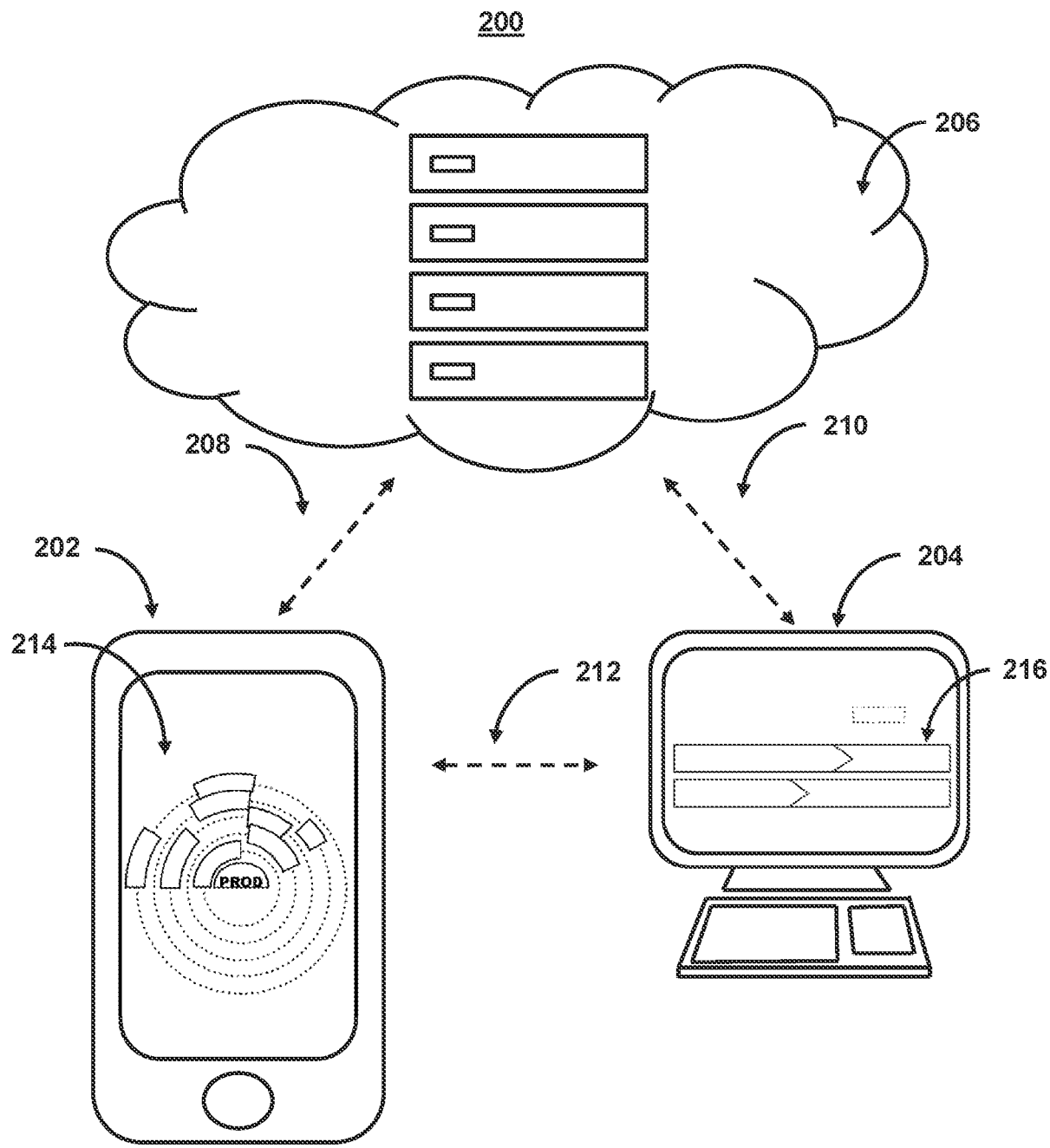
FIG. 2 shows an illustrative system for a content delivery management platform for managing multiple content delivery networks, in accordance with one or more embodiments.

FIG. 2 shows an illustrative system for a content delivery management platform for managing multiple content delivery networks, in accordance with one or more embodiments. As shown in FIG. 2, system 200 may include user device 202, user device 204, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 202 and user device 204 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 202, those operations may, in some embodiments, be performed by components of user device 204.

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 208, 210, and 212. Communication paths 208, 210, and 212 may include the Internet, a mobile phone network, a mobile voice or data network (e.g., a 4G or LTE network), a cable network, a public switched telephone network, or other types of communications networks or combinations of communications networks. Communication paths 208, 210, and 212 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

The computing devices may include additional communication paths linking a plurality of hardware, software, and/or firmware components operating together. For example, the computing devices may be implemented by a cloud of computing platforms operating together as the computing devices. For example, system 200 may include one or more cloud components (e.g., cloud component 206). Cloud components may include cloud-based storage circuitry configured to store a content delivery management platform, including an abstraction layer. Cloud component 206 may also include cloud-based control circuitry configured to integrate multiple content delivery networks using the abstraction layer. Cloud component 206 may also include cloud-based input/output circuitry configured to generate for display, on a user interface (e.g., user interface 100 (FIG. 1)) of a client device (e.g., user device 202, user device 204, and/or other components), a first graphical representation identifying applications that utilize one or more content delivery networks and/or data analytics about the utilization. System 200 may also present graphical representations 214 and 216.

Figure 3:
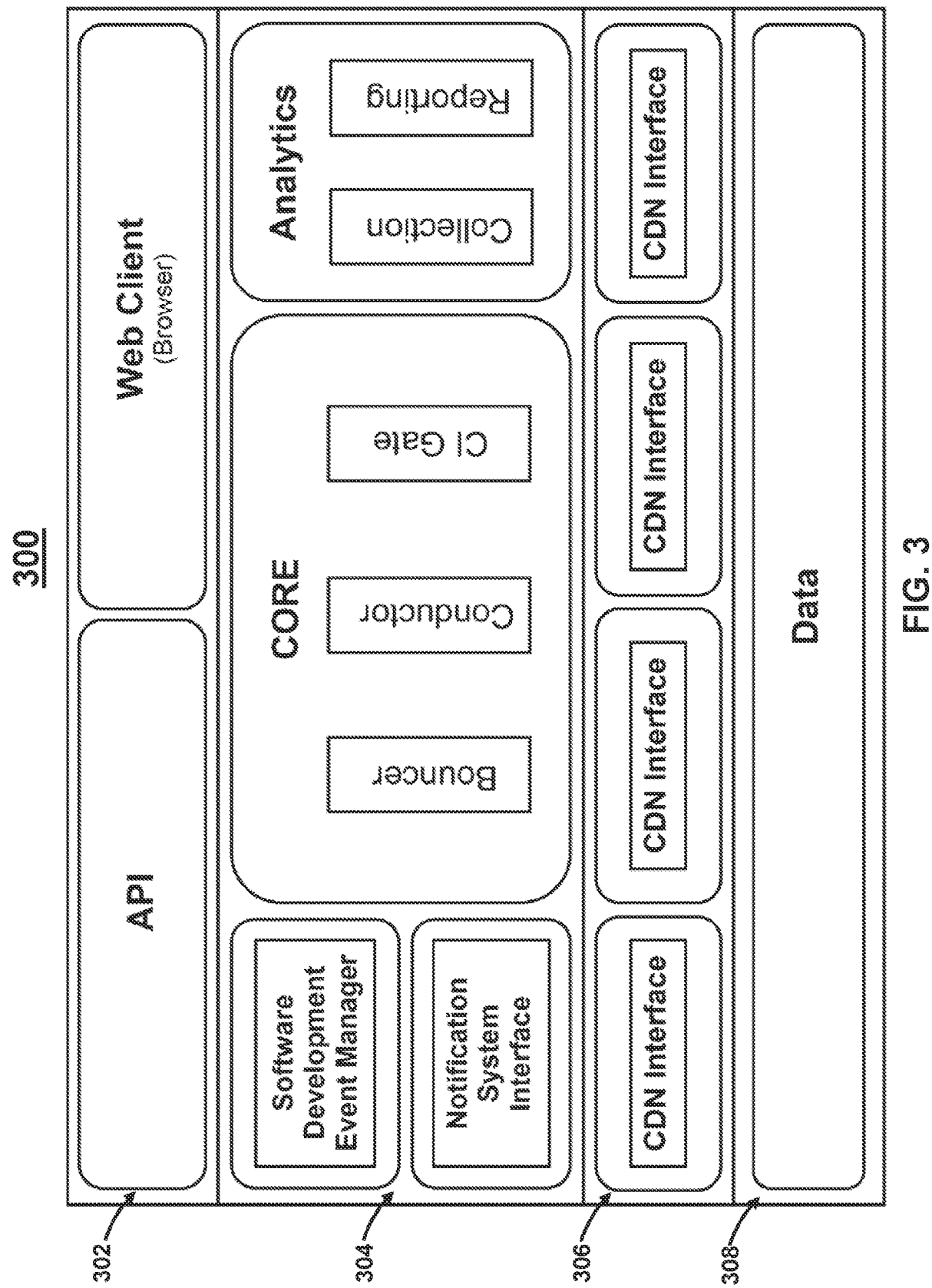
FIG. 3 shows a computer module diagram for a content delivery management platform for managing multiple content delivery networks, in accordance with one or more embodiments.

FIG. 3 shows a computer module diagram for a content delivery management platform for managing multiple content delivery networks, in accordance with one or more embodiments. For example, diagram 300 shows four layers of a content delivery management platform. Layer 302 may be used to generate user interface 100 (FIG. 1)). Layer 302 includes an API and web browser interface. For example, the API and web browser interface may comprise a set of functions and procedures allowing the creation of applications that access the features or data of an operating system, application, or other service. For example, layer 302 may allow one or more users to access the content delivery management platform. The content delivery management platform may then facilitate the use of access to the resources of the multiple content delivery networks.

Layer 304 comprises an abstraction layer. For example, layer 304 may facilitate the access to the resources of the multiple content delivery networks to the applications requesting access to the resources of the multiple content delivery networks via layer 302. Layer 304 may include an interface with a software development event manager. For example, the software development event manager may provide updates to the source code of the content delivery management platform. Layer 304 may also provide a notification interface system. The notification interface system may provide alerts on the status of source code updates, application integration, and/or utilization of content delivery networks.

Layer 304 may also include a Bouncer API. The Bouncer API may give the content delivery management platform access control for any visitor's IP address, based on a set of rules. Ruling system allows the content delivery management platform owner to ban a specific user, an IP range and/or an IP based in a specific country. The Bouncer API may also prevent content delivery networks from accessing the content delivery management platform if the content delivery networks do not conform to specific rules.

Layer 304 may also include a Conductor API, which may allow developers, applications, and/or content delivery networks to access the content delivery management platform remotely. The Conductor API may also be used to select authentication methods and provide rules for accessing the content delivery management platform. Layer 304 may also include a content integration gate. Layer 304 may also include one or more modules for providing analytics on use of the content delivery management platform by one or more applications and/or content delivery networks.

Layer 306 may include a plurality of content delivery network interfaces. For example, layer 306 may include a set of interfaces and mechanisms required for interconnecting a content delivery network with the abstraction layer (and the content delivery management platform). Accordingly, the content delivery management platform may enable the content delivery network to deliver content on behalf of the content delivery management platform. By connecting to multiple content delivery networks, the content delivery management platform offers benefits, such as footprint extension, reduced infrastructure costs, higher availability, etc., for content service providers and end users.

Layer 308 represents a datastore for the content delivery management platform from which content delivery networks may pull data for use and delivery to users. And/or applications. In some embodiments, the data store is a single data store that is accessible by each content delivery network using the same API and/or configuration. As each content delivery network has the same access and accesses the datastore using the same API, APIs for interfacing with the data store do not need to be re-written when migration content is delivered to the networks. Accordingly, the content delivery management platform prevents vendor lock in (i.e., the inability of the content delivery management platform from switching from one content delivery network to another).

FIG. 4 shows an architectural diagram of a content delivery management platform for managing multiple content delivery networks, in accordance with one or more embodiments. For example, system 400 includes content delivery management platform 402. For example, content delivery management platform 402 may generate for display user interface 100 (FIG. 1)). System 400 also includes content delivery networks 404. For example, content delivery networks 404 may comprise geographically distributed networks of proxy servers and their data centers. Content delivery networks 404 includes content delivery network 406 and gateway API 408. For example, gateway API 408 may provide an API gateway, from an internal private cloud environment of the content delivery management platform, to interact with the third-party content delivery networks 404.

System 400 also includes change management service 410. Change management service 410 may communicate with SDK 412. SDK 412 may be a collection of software development tools in one installable package. SDK 412 may include a compiler, debugger and/or a software framework. Workflow process management 414 provides governance for self-service, enforce change orders, and/or manage rollbacks. Workflow process management 414 may access storage 422 and storage 422 may store configuration state backups and configuration versions.

Object 416 may include a user interface infrastructure. Object 416 may also include a load balancer and auto scaling, which may monitor the applications and automatically adjust capacity to maintain steady and predictable performance. Object 428 may include monitoring framework, which may provide process logs, audits, metrics, and alerts (e.g., as accessible via user interface 100 (FIG. 1)). Object 428 may also access a log management service 430. Datastore 426 may store the abstraction layer (abstraction layer 304 (FIG. 3)) and costs related to content delivery networks.

Object 424 may comprise internal proxy APIs. In some embodiments, object 424 may comprise an API gateway that decouples the frontend and backend of the API, checking, essential security, demand steering, and convention interpretation. Object 432 may include an SDK for integration between workflow process management 414, content delivery networks 404, and software development event manager 442. For example, content delivery management platform 402 may receive configuration changes that may be propagated back to the source code for content delivery management platform 402. For example, object 424 may allow a manager to incrementally map a configuration from the source code repository.

System 400 may also include user access control 444 which may allow single sign-on user authentication process and/or other types of user authentication as well as user interface 450. User interface 450 may correspond to user interface 100 (FIG. 1)).

FIG. 5 shows illustrative pseudocode for a content delivery management platform, in accordance with one or more embodiments. For example, FIG. 5 may represent source code contributions committed to the content delivery management platform. In some embodiments, source code 500 and source code 550 may represent source code of the abstraction layer of the content delivery management platform. In particular, the coding structure of source code 500 and source code 550 may allow the content delivery management platform to operate in a CI/CD environment.

For example, changes to the source code for the content delivery management platform may be submitted to a source code repository. The source-code repository may be a file archive and web hosting facility for source code and the content delivery management platform. The source code repository may provide a bug tracking system, and offer release management, mailing lists, and wiki-based project documentation. For example, in some embodiments, the source code repository may correspond to software development event manager 442 (FIG. 4).

Source code 500 may represent a schema with a system context for a configuration file that corresponds to an application of the plurality of applications. For example, the content delivery management platform may use a source code repository to host content delivery network configuration files. Changes to the configuration files may include onboarding new subdomains or major changes and reroutes for multiple site paths. Accordingly, each configuration file 502 may include individual system contexts (e.g., context 504 and context 506). For example, the content delivery management platform may receive a source code commitment for the content delivery management platform and verify the source code commitment using the internal proxy APIs.

The individual system contexts (e.g., context 504 and context 506) may comprise individual domains and subdomains that may be affected by a given rule (e.g., governance protocol) or a source code change. For example, the system context may correspond to an application of the plurality of applications. Each system context may include an owner and/or one or more content delivery network associated with the system context. The content delivery management platform may then monitor the content delivery networks associated with each system context.

Source code 550 may include line 552, which may indicate a provider of the resources used to provide an application. Line 554 may then indicate one or more resources (e.g., domains of the content delivery management platform) that may be served by the system context. Line 556 may indicate metadata assigned/required by the content delivery management platform, and line 558 may indicate rules (e.g., governance protocol) associated with the system context and to which the content delivery networks must conform.

For example, the content delivery management platform may retrieve the system context for each application of a plurality of applications of the content delivery management platform. The content delivery management platform may determine the applications service by different content delivery management platforms based on content delivery networks identified in the system contexts. The content delivery management platform may then map the plurality of applications to the plurality of content delivery networks based on the respective system contexts for the plurality of applications.

Figure 6:
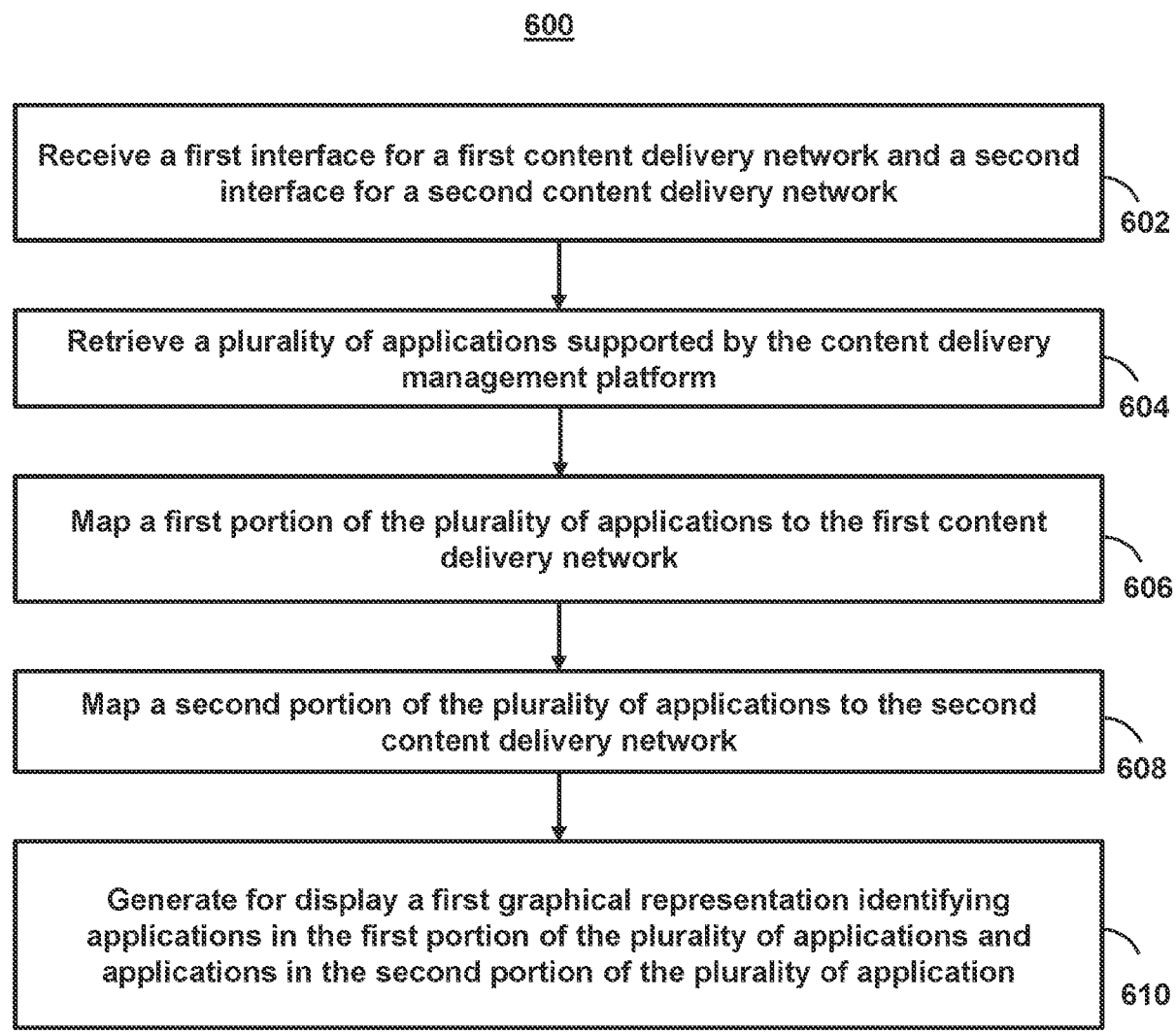
FIG. 6 shows a flowchart of the steps involved in managing multiple content delivery networks using a content delivery management platform, in accordance with one or more embodiments.

FIG. 6 shows a flowchart of the steps involved in managing multiple content delivery networks using a content delivery management platform, in accordance with one or more embodiments. For example, process 600 may represent the steps taken by one or more devices as shown in FIGS. 1-2.

At step 602, process 600 receives (e.g., via one or more components of system 200 (FIG. 2)) a first interface for a first content delivery network and a second interface for a second content delivery network. For example, the system may receive, at an abstraction layer of the content delivery management platform, a first interface for a first content delivery network and a second interface for a second content delivery network, wherein the first content delivery network comprises a first network of data processing resources, and wherein the second content delivery network comprises a second network of data processing resources.

In some embodiments, the abstraction layer may comprise a schema with a system context for a configuration file that corresponds to an application of the plurality of applications. For example, the abstraction layer may comprise a schema as described in FIG. 5. In some embodiments, the configuration file may further provide a governance protocol for an application of the plurality of applications. Additionally or alternatively, the abstraction layer may comprise a respective configuration file for each of the plurality of applications. For example, through the use of respective configuration files, the content delivery management platform may transition from an initial configuration where all applications share the same configuration to a configuration that allows the content delivery management platform to self-govern content delivery network configurations.

In some embodiments, the abstraction layer may comprise a plurality of internal proxy application programming interfaces ("APIs"). For example, the content delivery management platform may receive a source code commitment for the content delivery management platform. The content delivery management platform may then verify the source code commitment using the internal proxy APIs.

At step 604, process 600 retrieves (e.g., via one or more components of system 200 (FIG. 2)) a plurality of applications supported by the content delivery management platform. For example, the system may retrieve, at the abstraction layer, a plurality of applications supported by the content delivery management platform. In some embodiments, the abstraction layer may have numerous functions. For example, in some embodiments, the abstraction layer may allow for governance to be declared once and/or through a single authority (as opposed to a granular method where each content delivery network and/or application is an individual governance). Accordingly, the system may maintain controls and audit trails through single user inputs. For example, the system may receive a user input (e.g., via user interface 100 (FIG. 1)) to apply a governance protocol. The system may retrieve the governance protocol for the content delivery management platform. The system may then simultaneously apply the governance protocol to the first interface and the second interface.

At step 606, process 600 maps (e.g., via one or more components of system 200 (FIG. 2)) a first portion of the plurality of applications to the first content delivery network. For example, the system may map, at the abstraction layer, a first portion of the plurality of applications to the first content delivery network, wherein mapping the first portion of the plurality of applications comprises utilizing the first network of data processing resources to provide the first portion of the plurality of applications. In some embodiments, the system may also map an integration point of an application in the first portion of the plurality of applications in the first content delivery network. For example, in some embodiments, the abstraction layer may provide enhanced observability into content delivery network utilization. For example, the system may provide integration mapping for all utilized resources and integration points as well as built-in alerting mechanisms based on historical and/or current trends (e.g., via alert section 110 (FIG. 1)).

At step 608, process 600 maps (e.g., via one or more components of system 200 (FIG. 2)) a second portion of the plurality of applications to the second content delivery network. For example, the system may map, at the abstraction layer, a second portion of the plurality of applications to the second content delivery network, wherein mapping the second portion of the plurality of applications comprises utilizing the second network of data processing resources to provide the second portion of the plurality of applications.

At step 610, process 600 generates (e.g., via one or more components of system 200 (FIG. 2)) for display a first graphical representation identifying applications in the first portion of the plurality of applications and applications in the second portion of the plurality of applications. For example, the system may generate for display, on a user interface, a first graphical representation identifying applications in the first portion of the plurality of applications and applications in the second portion of the plurality of applications. Additionally or alternatively, the system may generate for display, on the user interface, a second graphical representation indicating a progress of an integration of the source code commitment. For example, as new source code commitments are added to the content delivery management platform, the system may provide updates on the integration of these source code commitments. In some embodiments, the integration of the source code commitment may be performed in a continuous integration and continuous deployment environment.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for managing multiple content delivery networks using a content delivery management platform, the method comprising: receiving, at an abstraction layer of the content delivery management platform, a first interface for a first content delivery network and a second interface for a second content delivery network, wherein the first content delivery network comprises a first network of data processing resources, and wherein the second content delivery network comprises a second network of data processing resources; retrieving, at the abstraction layer, a plurality of applications supported by the content delivery management platform; mapping, at the abstraction layer, a first portion of the plurality of applications to the first content delivery network, wherein mapping the first portion of the plurality of applications comprises utilizing the first network of data processing resources to provide the first portion of the plurality of applications; mapping, at the abstraction layer, a second portion of the plurality of applications to the second content delivery network, wherein mapping the second portion of the plurality of applications comprises utilizing the second network of data processing resources to provide the second portion of the plurality of applications; and generating for display, on a user interface, a first graphical representation identifying applications in the first portion of the plurality of applications and applications in the second portion of the plurality of applications.
2. The method of embodiment 1, further comprising: receiving a user input to apply a governance protocol; retrieving the governance protocol for the content delivery management platform; and simultaneously applying the governance protocol to the first interface and the second interface.
3. The method of embodiments 1-2, further comprising mapping, at the abstraction layer, an integration point of an application in the first portion of the plurality of applications in the first content delivery network.
4. The method of embodiments 1-3, wherein the abstraction layer comprises a schema with a system context for a configuration file that corresponds to an application of the plurality of applications.
5. The method of embodiments 1-4, wherein the abstraction layer comprises a schema with a system context for a configuration file that corresponds to an application of the plurality of applications.
6. The method of embodiments 1-6, wherein the abstraction layer comprises a respective configuration file for each of the plurality of applications.
7. The method of embodiments 1-7, wherein the abstraction layer comprises a plurality of internal proxy application programming interfaces ("APIs").
8. The method of embodiment 8, further comprising: receiving a source code commitment for the content delivery management platform; and verifying the source code commitment using the internal proxy APIs.
9. The method of embodiment 9, further comprising generating for display, on the user interface, a second graphical representation indicating a progress of an integration of the source code commitment.
10. The method of embodiment 10, wherein the integration of the source code commitment is performed in a continuous integration and continuous deployment environment.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:

1. A system for managing multiple content delivery networks using content delivery management platforms, the system comprising:
cloud-based storage circuitry configured to store an abstraction layer, wherein the abstraction layer comprises a schema with a respective system context in a configuration for each application of a plurality of applications of a content delivery management platform, and wherein a configuration file provides a governance protocol for each application of the plurality of applications;
cloud-based control circuitry configured to:
receive, at the abstraction layer of the content delivery management platform, a request, for an application of a plurality of applications, for processing using the content delivery management platform, wherein the content delivery management platform facilitates for a first content delivery network and a second content delivery network, wherein the first content delivery network comprises a first network of data processing resources, and wherein the second content delivery network comprises a second network of data processing resources;
generate a first mapping, at the abstraction layer, of a first portion of the plurality of applications to the first content delivery network based on respective system contexts for the plurality of applications;
generate a second mapping, at the abstraction layer, of a second portion of the plurality of applications to the second content delivery network based on the respective system contexts for the plurality of applications; and
cloud-based input/output circuitry configured to process the request based on the first mapping and the second mapping.

2. A method for managing multiple content delivery networks using content delivery management platforms, the method comprising:
receiving, at an abstraction layer of the content delivery management platform, a request, for an application of a plurality of applications, for processing using a content delivery management platform, wherein the content delivery management platform facilitates a first content delivery network and a second content delivery network, wherein the first content delivery network comprises a first network of data processing resources, and wherein the second content delivery network comprises a second network of data processing resources;
retrieving a first mapping, at the abstraction layer, of a first portion of the plurality of applications, wherein the first portion of the plurality of applications comprises a first subset of the plurality of applications that utilize the first network of data processing resources to process requests from the first subset of the plurality of applications;
retrieving a second mapping, at the abstraction layer, of a second portion of the plurality of applications, wherein the second portion of the plurality of applications comprises a second subset of the plurality of applications that utilize the second network of data processing resources to process requests from the second subset of the plurality of applications; and
processing the request based on the first mapping and the second mapping.

3. The method of claim 2, further comprising:
receiving a user input to apply a governance protocol;
retrieving the governance protocol for the content delivery management platform; and
simultaneously applying the governance protocol to a first interface for the first content delivery network and a second interface for the second content delivery network.

4. The method of claim 2, wherein the first mapping includes an integration point of an application in the first portion of the plurality of applications in the first content delivery network.

5. The method of claim 2, wherein the abstraction layer comprises a schema with a system context for a configuration file that corresponds to an application of the plurality of applications.

6. The method of claim 5, wherein the configuration file provides a governance protocol for an application of the plurality of applications.

7. The method of claim 2, wherein the abstraction layer comprises a respective configuration file for each of the plurality of applications.

8. The method of claim 2, wherein the abstraction layer comprises internal proxy application programming interfaces ("APIs").

9. The method of claim 8, further comprising:
receiving a source code commitment for the content delivery management platform; and
verifying the source code commitment using the internal proxy APIs.

10. The method of claim 9, further comprising generating for display, on a user interface, a graphical representation indicating a progress of an integration of the source code commitment.

11. The method of claim 10, wherein the integration of the source code commitment is performed in a continuous integration and continuous deployment environment.

12. A non-transitory, computer-readable medium for managing multiple content delivery networks using a content delivery management platform, comprising instructions that, when executed by one or more processors, cause operations comprising:
receiving, at an abstraction layer of the content delivery management platform, a request, for an application of a plurality of applications, for processing using a content delivery management platform, wherein the content delivery management platform facilitates for a first content delivery network and a second content delivery network, wherein the first content delivery network comprises a first network of data processing resources, and wherein the second content delivery network comprises a second network of data processing resources;
retrieving a first mapping, at the abstraction layer, of a first portion of the plurality of applications, wherein the first portion of the plurality of applications comprises a first subset of the plurality of applications that utilize the first network of data processing resources to process requests from the first subset of the plurality of applications;
retrieving a second mapping, at the abstraction layer, of a second portion of the plurality of applications, wherein the second portion of the plurality of applications comprises a second subset of the plurality of applications that utilize the second network of data processing resources to process requests from the second subset of the plurality of applications; and
processing the request based on the first mapping and the second mapping.

13. The non-transitory, computer-readable medium of claim 12, wherein the instructions further cause operations comprising:
receiving a user input to apply a governance protocol;
retrieving the governance protocol for the content delivery management platform; and simultaneously applying the governance protocol to a first interface for the first content delivery network and a second interface for the second content delivery network.

14. The non-transitory, computer-readable medium of claim 12, wherein the first mapping includes an integration point of an application in the first portion of the plurality of applications in the first content delivery network.

15. The non-transitory, computer-readable medium of claim 12, wherein the abstraction layer comprises a schema with a system context for a configuration file that corresponds to an application of the plurality of applications.

16. The non-transitory, computer-readable medium of claim 15, wherein the configuration file provides a governance protocol for an application of the plurality of applications.

17. The non-transitory, computer-readable medium of claim 12, wherein the abstraction layer comprises a respective configuration file for each of the plurality of applications.

18. The non-transitory, computer-readable medium of claim 17, wherein the abstraction layer comprises internal proxy application programming interfaces ("APIs").

19. The non-transitory, computer-readable medium of claim 18, wherein the instructions further cause operations comprising:
receiving a source code commitment for the content delivery management platform; and
verifying the source code commitment using the internal proxy APIs.

20. The non-transitory, computer-readable medium of claim 19, wherein the instructions further cause operations comprising generating for display, on a user interface, a graphical representation indicating a progress of an integration of the source code commitment, wherein the integration of the source code commitment is performed in a continuous integration and continuous deployment environment.

* * * * *